(12) United States Patent
Clift et al.

(10) Patent No.: US 8,065,736 B2
(45) Date of Patent: Nov. 22, 2011

(54) USING ASYNCHRONOUS CHANGES TO MEMORY TO DETECT MALWARE

(75) Inventors: Neill M. Clift, Kirkland, WA (US); Jonathan D. Morrison, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1365 days.

(21) Appl. No.: 11/447,462

(22) Filed: Jun. 6, 2006

(65) Prior Publication Data

US 2008/0022406 A1 Jan. 24, 2008

(51) Int. Cl.
G06F 12/14 (2006.01)

(52) U.S. Cl. .......................................................... 726/24

(58) Field of Classification Search ................ 726/22–25
See application file for complete search history.

(56) References Cited

U.S. PATENT DOCUMENTS

| | | | |
|---|---|---|---|
| 4,761,730 A | 8/1988 | Ng et al. | |
| 5,684,875 A * | 11/1997 | Ellenberger | 482/4 |
| 6,772,345 B1 | 8/2004 | Shetty | |
| 2005/0015606 A1 | 1/2005 | Blamires et al. | |
| 2005/0021994 A1 | 1/2005 | Barton et al. | |
| 2005/0071649 A1 | 3/2005 | Shipp | |
| 2005/0138583 A1 | 6/2005 | Ouyang | |
| 2005/0154900 A1 | 7/2005 | Muttik | |
| 2005/0172338 A1 | 8/2005 | Sandu et al. | |
| 2005/0188272 A1 | 8/2005 | Bodorin et al. | |
| 2005/0204205 A1 * | 9/2005 | Ring et al. | 714/47 |
| 2005/0216770 A1 | 9/2005 | Rowett et al. | |
| 2005/0229250 A1 | 10/2005 | Ring et al. | |
| 2005/0268112 A1 | 12/2005 | Wang et al. | |
| 2006/0031673 A1 * | 2/2006 | Beck et al. | 713/164 |
| 2007/0022287 A1 * | 1/2007 | Beck et al. | 713/164 |
| 2007/0067844 A1 * | 3/2007 | Williamson et al. | 726/24 |
| 2007/0101431 A1 * | 5/2007 | Clift et al. | 726/24 |

OTHER PUBLICATIONS

"a-squared Anti-Malware", http://www.emsisoft.com/en/software/personal/.
"OS Independent Run-time System Integrity Services", http://www.intel.com/technology/comms/download/system_integrity_services.pdf.
"Spyware Doctor™ 3.5 for Windows", http://wwvv.pctools.com/spyvvare-doctor/.
Christodorescu, Mihai, et al., "Semantics-Aware Malware Detection", http://www.eecs.berkeley.edu/~sseshia/pubdir/oakland05.pdf.

* cited by examiner

*Primary Examiner* — Kim Vu
*Assistant Examiner* — John B King

(57) ABSTRACT

A system and method for using asynchronous changes to memory to detect malware is disclosed. The technology initially receives a memory buffer location to be evaluated, the memory buffer location possibly having at least a portion of malware therein. The technology then performs a plurality of double fetches to the memory buffer location. The technology additionally compares a plurality of responses to the plurality of double fetches, wherein a plurality of similar responses to the plurality of double fetches indicates the portion of malware is not present and wherein at least two distinct responses to the plurality of double fetches indicates the portion of malware is present.

20 Claims, 3 Drawing Sheets

USING ASYNCHRONOUS CHANGES TO MEMORY TO DETECT MALWARE

BACKGROUND

Malware is software designed to infiltrate or damage a computer system, without the owner's consent. The term is probably a combination of "malicious" and "software", and describes the intent of the creator, rather than any particular features. The term malware normally encompasses computer viruses, Trojan horses, spyware and adware.

Many early infectious programs, including the Internet Worm and a number of viruses, were written as experiments or pranks. That is, they were intended to be annoying rather than to cause serious damage. For example, programmers might write an infectious program just to prove that they can do it, or to see how far the infectious program could spread.

A slightly more hostile intent can be found in programs designed to vandalize or cause data loss. For example, some viruses are designed to destroy files or corrupt a file system by writing junk data. Other viruses include network-borne worms designed to vandalize Web pages. In other cases, revenge is the motivator for writing malicious software. For example, a programmer about to be fired from a job will generate a virus to damage the former employer's systems or destroy the programmer's own earlier work.

Moreover, a large portion of malicious software is focused strictly on a profit motive. For example, a majority of viruses and worms have been designed to take control of users' computers. Infected computers are "hijacked" and are remotely used to send email spam, host contraband data or engage in distributed denial-of-service attacks as a form of extortion.

Another strictly for-profit category of malware has emerged in spyware. That is, programs designed to monitor users' Internet browsing. In some cases, the spyware displays unsolicited advertisements which provide marketing revenues to the spyware creator.

Presently, stealth malware will try to hide itself on the computing system such that user's cannot see it. Thus, the user will not recognize the malware infection and as such, will not know that the computing system is infected until it is too late. That is, after the malware has performed its malicious purpose. In one case, the malware will hook the application programming interface (API) to present a view of the filesystem, registry, and the like that doesn't show or contain the resources of the malware.

Current methods for detecting stealth malware include checking or detecting patching of either data-structures or code. However, the malware can easily change the patch points to bypass these checks. Moreover, the checking and detecting techniques likely requires loading kernel mode drivers which is difficult and time consuming.

Therefore, what is needed is a method for using asynchronous changes to memory to detect malware.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for using asynchronous changes to memory to detect malware is disclosed. The technology initially receives a memory buffer location to be evaluated, the memory buffer location possibly having at least a portion of malware therein. The technology then performs a plurality of double fetches to the memory buffer location. The technology additionally compares a plurality of responses to the plurality of double fetches, wherein a plurality of similar responses to the plurality of double fetches indicates the portion of malware is not present and wherein at least two distinct responses to the plurality of double fetches indicates the portion of malware is present.

DESCRIPTION OF THE DRAWINGS

The accompanying drawings, which are incorporated in and form a part of this specification, illustrate embodiments of the technology for using asynchronous changes to memory to detect malware and, together with the description, serve to explain principles discussed below.

The drawings referred to in this description should be understood as not being drawn to scale except if specifically noted.

DETAILED DESCRIPTION

Reference will now be made in detail to embodiments of the present technology for using asynchronous changes to memory to detect malware, examples of which are illustrated in the accompanying drawings. While the technology for using asynchronous changes to memory to detect malware will be described in conjunction with various embodiments, it will be understood that they are not intended to limit the present technology for using asynchronous changes to memory to detect malware to these embodiments. On the contrary, the presented technology for using asynchronous changes to memory to detect malware is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for using asynchronous changes to memory to detect malware. However, the present technology for using asynchronous changes to memory to detect malware may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for using asynchronous changes to memory to detect malware is also well suited to the use of other computer systems such as, for example, optical and mechanical computers. Additionally, it should be understood that in embodiments of the present technology for using asynchronous changes to memory to detect malware, one or more of the steps can be performed manually.

Example Computer System Environment

Figure 1:
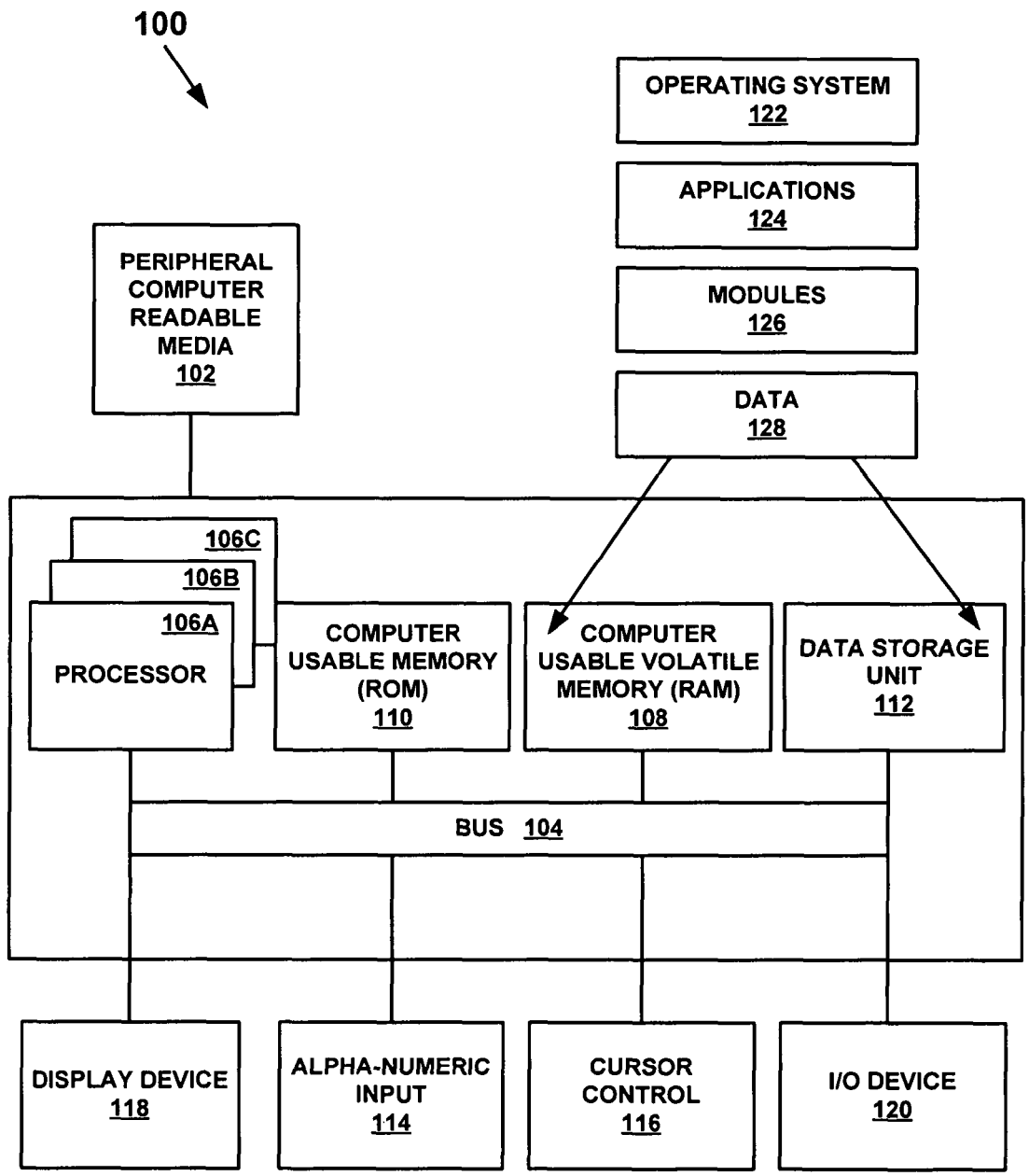
FIG. 1 is a diagram of an exemplary computer system used in accordance with embodiments of the present technology for using asynchronous changes to memory to detect malware.

With reference now to FIG. 1, portions of the technology for using asynchronous changes to memory to detect malware are composed of computer-readable and computer-executable instructions that reside, for example, in computer-usable media of a computer system. That is, FIG. 1 illustrates one example of a type of computer that can be used to implement embodiments, which are discussed below, of the present technology for using asynchronous changes to memory to detect malware.

FIG. 1 illustrates an exemplary computer system 100 used in accordance with embodiments of the present technology for using asynchronous changes to memory to detect malware. It is appreciated that system 100 of FIG. 1 is exemplary only and that the present technology for using asynchronous changes to memory to detect malware can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for using asynchronous changes to memory to detect malware is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for using asynchronous changes to memory to detect malware, for example, is stored as an application 124 or module 126 in memory locations within RAM 108 and memory areas within data storage unit 112.

Overview

As an overview, in one embodiment, the present technology provides a method and system for using asynchronous changes to memory to detect malware. In one embodiment, the present technology exploits the double fetch (the first fetch used for inspection of parameters by the malware; the second fetch used by the legitimate system call to give a legitimate response) to bypass the malware's test and get the legitimate system call to access objects that the malware is trying to hide.

However, this is a probabilistic process. In other words, the actual behavior depends on accidents of timing. Therefore, the malware detection code using this technique must run repeatedly in order to increase the probability of successful detection of the malware.

In one embodiment, the technology utilizes two user threads, both with access to the same buffer(s) used for parameters to a system call. The first thread actually makes the system call with that buffer or set of buffers. The second thread runs an infinite loop, during the course of the first thread system call, continually modifying the buffer(s) holding the input parameter(s). That is, the second thread is activated just before the system call is made and terminated when the call returns. In one embodiment, the buffer can be modified by changing one character in the middle of a string. For example, alternating between the name of a hidden object and a name that doesn't equal that of the hidden object. Although file names and registry key strings are used as examples herein, this technique is not limited to file names and registry key strings. However, those examples are the easiest to visualize and are cited here for purposes of brevity and clarity.

As described herein, malware is a general term for software with malicious intent. Malware can include root kits, may contain stealthing code, keyboard filters to steal bank details and anti-delete technologies. In many cases, the malware code is designed to steal, damage data and disclose information about the user.

Adware/Spyware is code which displays advertisements and collects demographic information. In many cases, the adware/spyware contains anti-delete technologies to protect them from users and other adware/spyware programs that try to uninstall them.

Root Kits are Code that typically inserts trapdoors into a system to allow attackers to reenter at a later date. Typically the root kits allow easy bypassing of normal operating system access controls and stealthing technologies to hide themselves and other files used by the attacker. Use of low-level techniques often means code runs in kernel mode. Root kits are a very specific kind of malware. Stealth is a generic term referring to various well-known techniques that malware typically utilizes to remain hidden from legitimate users of the infected machines.

Figure 2:
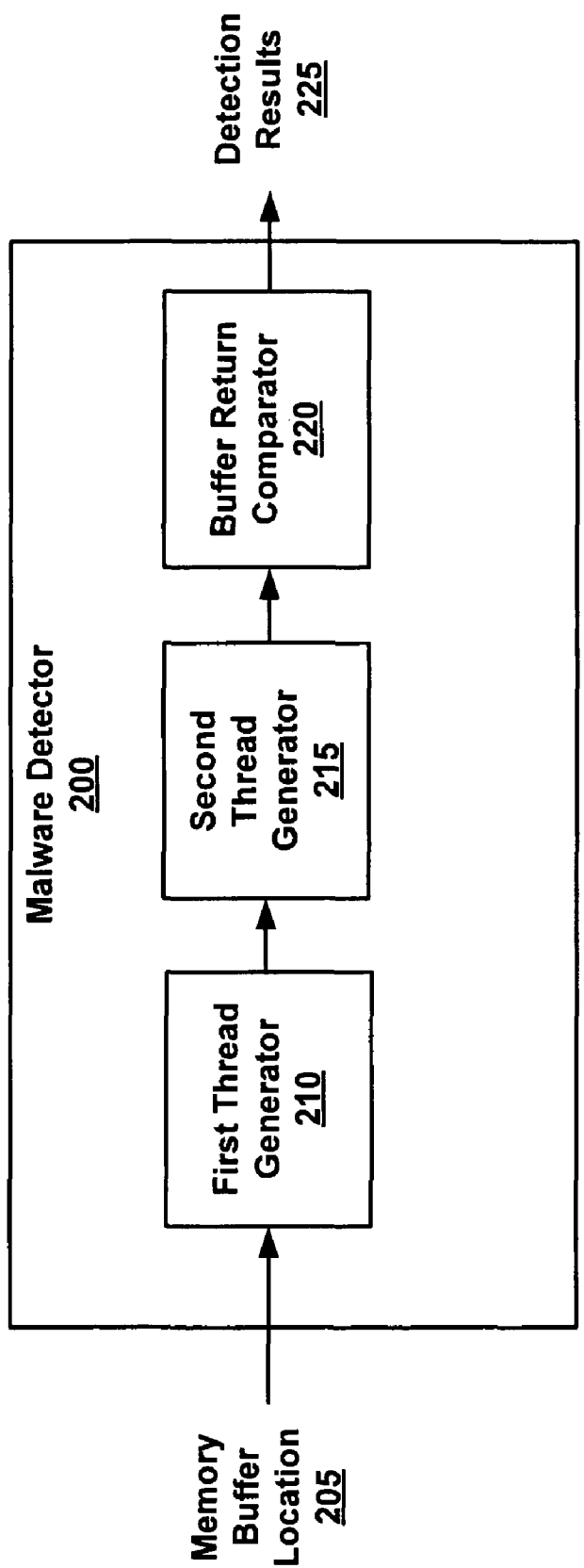
FIG. 2 is a block diagram of an exemplary malware detector in accordance with an embodiment of the present technology for using asynchronous changes to memory to detect malware.

With reference now to FIG. 2, a block diagram of an exemplary malware detector is shown in accordance with an embodiment of the present technology for using asynchronous changes to memory to detect malware. In one embodiment, malware detector 200 includes a first thread generator 210, a second thread generator 215 and a buffer return comparator 220.

In general, malware detector 200 receives a memory location 205 describing objects possibly hidden by malware. The malware detector 200 then performs the malware detection double fetch operation described in detail herein. The malware detector 200 then provides detection results 225.

Operation

Figure 3:
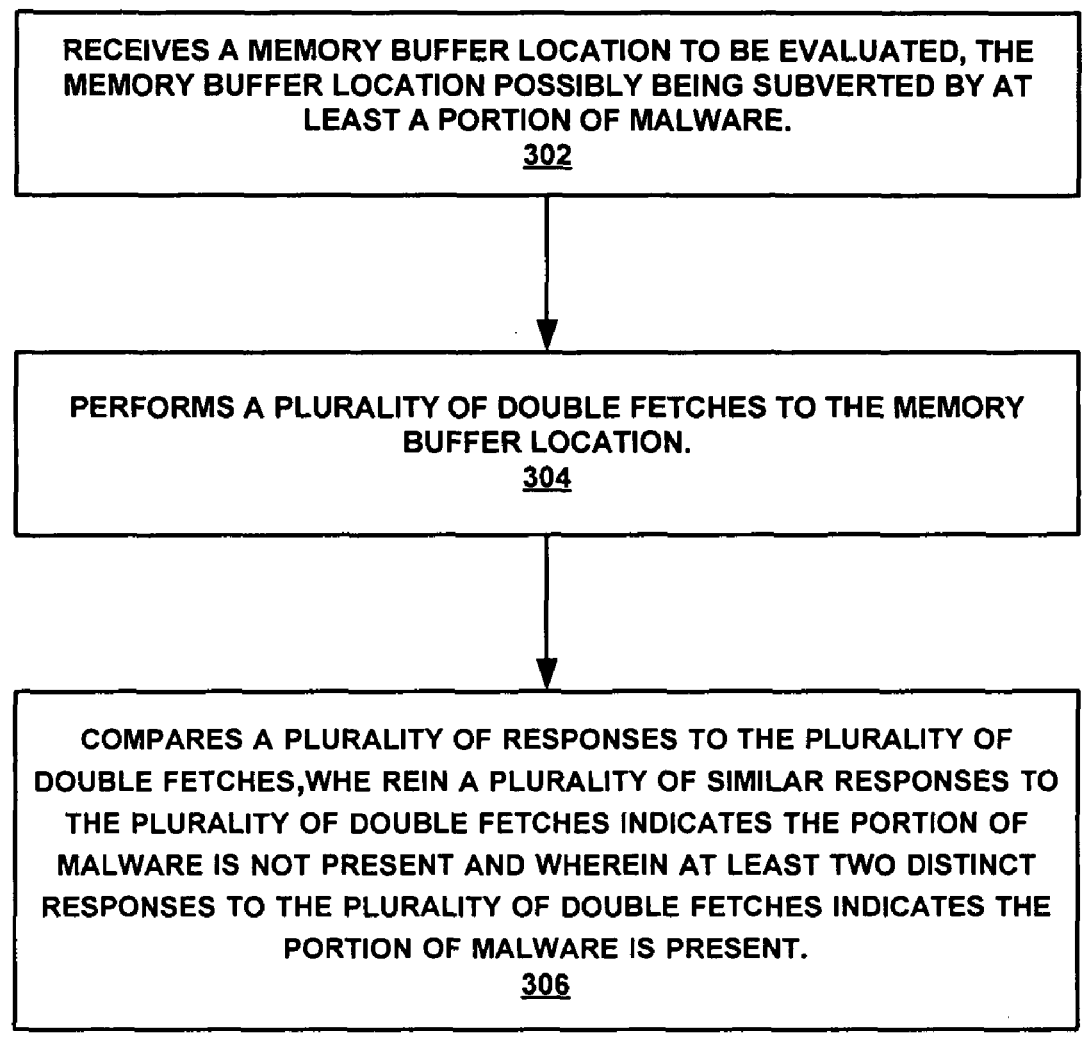
FIG. 3 is a flowchart of operations performed in accordance with one embodiment of the present technology for using asynchronous changes to memory to detect malware.

With reference now to FIG. 3, a flowchart 300 of operations performed in accordance with one embodiment of the present technology for using asynchronous changes to memory to detect malware is shown. Advantageously, the present technology provides a method for detecting malware without requiring kernel code drivers. Moreover, unlike present approaches, the malware detector 200 provides a difficult workaround. That is, the code necessary to work around the detector is extremely difficult to write.

Referring now to 302 of FIG. 3 and to FIG. 2, one embodiment of the present technology receives a memory buffer location 205 to be evaluated, the memory buffer location 205 possibly being subverted by at least a portion of malware. In one embodiment, the memory buffer location 205 to be evaluated is a memory buffer location 205 that the malware is known to subvert.

For example, the user may have gone to a specific website, received a specific email, or be aware of a possible malware threat that may have been received. Therefore, although no overt computer operations are providing evidence of the malware, a specific malware threat is a possibility. Thus, the user may know things about the malware such as, but not limited to, the name of the directory, register or the like in which the malware resides. In another embodiment, the user may initially suspect malware due to incongruous system functionality.

One of the most common methods used by stealthy malware is to insert code in a system and hide its existence from the user. For example, a root kit hooks operating system calls to monitor the memory buffers being accessed. That is, code is inserted to test the parameters of a call before passing the call along to the legitimate operating system function, e.g., a kernel or the like. For example, the requesting parameters specify an object, such as a call to a memory buffer, which the malware may or may not want to hide. Generally, the malware would hide the information if it would identify the malware or the presence of the malware. Otherwise, the malware may decide to leave it alone.

For example, a buffer location 205 is passed to the kernel. The buffer may contain strings the malware is interested in or wants to subvert the functionality thereof. The malware will intercept and evaluate the call to the kernel. If the call is not to a registry that the malware is hiding, or if the malware allows, the request will remain unmolested and be passed to the kernel. In so doing, the correct registry will be accessed and the malware will remain undiscovered.

However, if the requested registry does contain information the malware is hiding, then the request will be modified. For example, a result such as "file not found", rubbish information, the wrong registry, or the like will be returned.

However, one problem with the malware hooking process is that a bit of time passes each time the malware looks at a request and then passes on the request to the kernel. The present technology uses the delay in the request-evaluation-response process, in conjunction with a double fetch, to exploit the malware vulnerability.

With reference now to 304 of FIG. 3 and to FIG. 2, one embodiment performs a plurality of double fetches to the memory buffer location 205. In one embodiment, the double fetch consists of a first thread 210 and a second thread 215 capable of accessing the same memory buffer location 205. The first thread 210 is utilized to make a first system call to the memory buffer location 205. In addition, the second thread is utilized to make a plurality of second system calls to the memory buffer location 205 during the first system call to the memory buffer location 205.

For example, in a "double fetch" the system call is not the full data but rather a pointer to a buffer that contains the full data (e.g., file path name or a registry key). That buffer is in user space. The double fetch is a double (or more) read of that buffer in user space. In other words, because the buffer is in user memory, it is possible for a second thread to modify this buffer during the course of the first thread system call.

This technique works on uni-processor 106A systems as well as multi-processor (106A, 106B, 106C, etc.) system due to the fact that threads can context swap even in the kernel. For example, in a uni-processor 106A system, the processor 106A is not capable of running the first thread 210 and the second thread 215 simultaneously. That is, the processor 106A for detecting the malware supports only one thread at a time. Therefore, forced process switching or the like, is used to interleave the first thread 210 and the second thread 215.

However, in the multi-processor system, the processor 106A, 106B, 106C, etc. are capable of running the first thread 210 and the second thread 215 simultaneously. For example, the malware detector 200 could be a multi-core processor 106A, a hyper-threading processor 106A, or the like. Moreover, as systems with multiple cores become more common, the amount of simultaneous user thread execution will increase and therefore the probability of such simultaneous access to a user buffer will increase.

In well-written user code, a buffer is filled prior to the system call and is not touched by any user code until the call returns. Such code would not produce any undesirable results from double fetch. In well-written system code, the code must protect itself against poorly written user code—in which the buffer holding parameter values is subject to change during the course of the system call—so well-written system code will make a copy of the parameters from user memory into kernel memory and then operate on that copy. The copy cannot be accessed by the user and therefore will not change due to user-code behavior.

However, malware, such as root kit code, is not typically written like the well-written system code described above. It typically assumes that user parameters will not change during a call—so it does not make private copies that are then passed into the real system call. Due to this malware shortcoming, there is a distinct probability that the buffer contents will change between the time the root kit code inspects the incoming parameters and the time the real system code accesses those parameters. Embodiments described herein, take advantage of that possibility.

For example, a portion (or a complete) malware is trying to hide a particular directory. The user believes the malware is performing the subversion but cannot detect the presence of the malware because when the user looks in the specific memory location the malware intercepts the call and the operating system will return a false response. However, by utilizing the technology described herein, the first thread provides a call to the specific memory buffer in question. Then a second thread is used to modify the first threads call.

That is, the address of the memory buffer call of the first thread is then set up to be sent to a benign directory when the call is initially made by the first thread. The second thread then changes the first thread buffer call on the fly, continuously, to the actual desired, probably infected, subverted memory buffer. This call is repeatedly performed by the first thread and repeatedly changed by the second thread, up to and including 40 or more times.

Due to the request-evaluation-response time required for the malware to intercept the call, at least one of the 30-40 or more calls will result in one or more calls slipping past the malware, thereby bypassing the validation. In so doing, the resultant response from that validation bypassing call will be different than the results of the other 29-39 responses.

Referring now to 306 of FIG. 3 and to FIG. 2, one embodiment compares a plurality of responses to the plurality of double fetches, wherein a plurality of similar responses to the plurality of double fetches indicates the portion of malware is not present and wherein at least two distinct responses to the plurality of double fetches indicates the portion of malware is present. As described herein, in one embodiment, the detecting of the malware is performed without requiring operating system support or kernel level code in the form of drivers.

For example, when there is no malware present, the memory buffer will constantly return the same results regardless of the number of times the double fetch occurs. However, if there is malware and it is intercepting and subverting the calls, due to the shear number of times the first thread 210 and second thread 215 are initiated, more than one version of a response will be received. For example, during the call the buffer will contain a non-hidden value (e.g., file name) when the malware inspects it but the hidden value when the legitimate system call code processes it (e.g., the $12^{th}$, $29^{th}$, $39^{th}$ etc. call).

Therefore, the plurality of system calls will return the results for that hidden value and the malware filter will have been bypassed. Even on a machine where the first thread 210 and second thread 215 have their own processor 106A, 106B, 106C, etc., the probability of both of these conditions being true is rarely more than 1 in 4. On such a computing system, the thread doing the modifications would have to do a pseudo-random wait between modifications in order to prevent accidental synchronization with the system call code. On a machine with only one processor 106A, a scheduler interrupt is engineered in the code such that the process switch would happen early during the system call—but after the call has started.

Thus, the present embodiments provide a method and system for using asynchronous changes to memory to detect malware. In addition, embodiments described herein provide a method and system for using asynchronous changes to memory to detect malware without requiring any kernel code. Furthermore, embodiments described herein provide a method and system for using asynchronous changes to memory to detect malware which detects the malware by detecting the actions performed by the malware.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using asynchronous changes to memory to detect malware, said method comprising:
   employing at least one processor configured to execute computer-executable instructions stored in memory to perform the following acts:
   receiving a memory buffer location to be evaluated, said memory buffer location possibly being subverted by at least a portion of malware;
   performing a plurality of double fetches to said memory buffer location, wherein each of the plurality of double fetches comprises a first fetch used for inspection of buffer contents in the memory buffer location, and a second fetch used by a legitimate system call to detect changes in the buffer contents made by the malware; and
   comparing a plurality of responses to said plurality of double fetches, wherein a plurality of similar responses to said plurality of double fetches indicates said portion of malware is not present and wherein at least two different responses to said plurality of double fetches indicates said portion of malware is present.

2. The method of claim 1 wherein at least two distinct responses to said plurality of double fetches further comprises:
   receiving a first response containing a non-hidden value when the malware subverts the buffer and receiving a hidden value when the malware is bypassed by at least one of said plurality of said double fetches.

3. The method of claim 1 further comprising:
   selecting said memory buffer location to be analyzed based on a known memory buffer location subverted by said malware.

4. The method of claim 1 wherein performing said double fetch comprises:
   utilizing a first thread to make a first system call to said memory buffer location; and
   utilizing a second thread to make a plurality of second system calls to said memory buffer location during said first system call to said memory buffer location.

5. The method of claim 4 further comprising:
   utilizing a multi-core processor to detect said portion of said malware, said multi-core processor for running said first thread and said second thread simultaneously.

6. The method of claim 4 further comprising:
utilizing a hyper-threading processor to detect said portion of said malware, said hyper-threading processor for running said first thread and said second thread simultaneously.

7. The method of claim 4 further comprising:
performing a forced process switching to interleave said first thread and said second thread when a processor for detecting said portion of said malware supports only one thread.

8. The method of claim 1 further comprising:
detecting said portion of said malware without requiring kernel level code in the form of drivers.

9. A malware detector comprising:
a first thread generator having access to a memory buffer holding at least one input parameter, said first thread generator for making a first system call to said memory buffer;
a second thread generator also having access to said memory buffer, said second thread for making a plurality of second system calls to said memory buffer during said first system call of said first thread generator, to continually modify the memory buffer holding the at least one input parameter;
a memory buffer return comparator for comparing a result of said first system call to said memory buffer and a result of each of said plurality of second system calls to said memory buffer, wherein a discrepancy between any of said results of said system calls indicates a presence of malware; and
a processor configured to execute computer-executable instructions stored in memory, the memory includes the first thread generator, the second thread generator, and the memory buffer return comparator.

10. The malware detector of claim 9 wherein selecting of said memory buffer to be analyzed is based on a known memory buffer location subverted by said malware.

11. The malware detector of claim 9 further comprising:
a multi-core processor for detecting said malware, said multi-core processor running said first thread and said second thread simultaneously.

12. The malware detector of claim 9 further comprising:
a hyper-threading processor for detecting said malware, said hyper-threading processor running said first thread and said second thread simultaneously.

13. The malware detector of claim 9 further comprising:
a forced process switch for interleaving said first thread and said second thread when a processor for detecting said malware supports only one thread.

14. The malware detector of claim 9 wherein detecting said malware does not require kernel level code in the form of drivers.

15. A method for using asynchronous changes to memory to detect malware, said method comprising:
employing at least one processor configured to execute computer-executable instructions stored in memory to perform the following acts:
creating a first thread having access to a memory buffer;
creating a second thread also having access to said memory buffer;
utilizing said first thread to make a first system call to said memory buffer; and
utilizing said second thread to make a plurality of second system calls to said memory buffer during said first system call to said memory buffer, to continually modify, on the fly, the first thread system call; and
comparing a result of said first system call to said memory buffer and a result of each of said plurality of second system calls to said memory buffer, wherein a discrepancy between any of said results of said system calls indicates a presence of malware.

16. The method of claim 15 further comprising:
selecting said memory buffer to be analyzed for detecting said malware based on a known memory buffer location subverted by said malware.

17. The method of claim 15 further comprising:
utilizing a multi-core processor to detect said malware, said multi-core processor for running said first thread and said second thread simultaneously.

18. The method of claim 15 further comprising:
utilizing a hyper-threading processor to detect said malware, said hyper-threading processor for running said first thread and said second thread simultaneously.

19. The method of claim 15 further comprising:
performing a forced process switching to interleave said first thread and said second thread when a processor for detecting said malware supports only one thread.

20. The method of claim 15 further comprising:
detecting said malware without requiring kernel level code in the form of drivers.

* * * * *